(12) United States Patent
Katsu

(10) Patent No.: US 7,113,294 B2
(45) Date of Patent: Sep. 26, 2006

(54) INK JET RECORDING APPARATUS AND CONTROLLING METHOD WITH SELECTIVE CLOCK SIGNAL SUPPLY

(75) Inventor: Takuji Katsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 952 days.

(21) Appl. No.: 10/157,808

(22) Filed: May 31, 2002

(65) Prior Publication Data

US 2002/0186395 A1     Dec. 12, 2002

(30) Foreign Application Priority Data

Jun. 7, 2001 (JP) ............................. 2001-172597
May 22, 2002 (JP) ............................. 2002-147668

(51) Int. Cl.
G06K 15/00 (2006.01)
G06F 3/12 (2006.01)

(52) U.S. Cl. .................................... 358/1.14; 358/1.13

(58) Field of Classification Search ............... 358/1.14, 358/1.15, 1.13, 1.8, 502, 501, 401, 409, 410, 358/411, 412–417, 426.09
See application file for complete search history.

(56) References Cited

U.S. PATENT DOCUMENTS 5,636,332 A   6/1997   Hibino ........................ 395/112
5,918,061 A   6/1999   Nikjou .................. 395/750.06
6,072,472 A * 6/2000   Shiga ........................ 345/168
6,926,380 B1 * 8/2005  Narazaki et al. ............... 347/5

FOREIGN PATENT DOCUMENTS

| EP | 0 526 189 | 2/1993 |
| EP | 0 657 846 | 6/1995 |
| JP | 5-32018 | 2/1993 |
| JP | 8-72363 | 3/1996 |

* cited by examiner

*Primary Examiner*—Douglas Q. Tran
(74) *Attorney, Agent, or Firm*—Fitzpatrick, Cella, Harper & Scinto

(57) ABSTRACT

A CPU that has transferred to a stop mode in order to reduce power consumption can be restarted from a control section of a printer, but cannot be restarted by an instruction from a host computer. The printer according to the present invention includes an interface control section for communicating with the host computer; a CPU having a mode in which the CPU is on standby in a low power consumption state; and a clock control section supplying a clock signal. The clock control section supplies a clock signal only to the interface control section when the CPU transfers to the stop mode.

23 Claims, 3 Drawing Sheets

INK JET RECORDING APPARATUS AND CONTROLLING METHOD WITH SELECTIVE CLOCK SIGNAL SUPPLY

BACKGROUND OF THE INVENTION

1. Field of the Invention

The present invention relates to an ink jet recording device having an interface, and particularly, to a low power consumption type controlling method for an ink jet recording device utilizing a clock control circuit that supplies a clock signal to logic circuitry including a CPU having a plurality of operation modes. More particularly, the present invention relates to a controlling method applicable to an ink jet recording device using a USB interface.

2. Description of the Related Art

In recent years, with the development of personal computers, the techniques of ink jet recording devices (printers) have also made a breakthrough. The printer is arranged to record an image on recording paper (paper, OHP film, cloth, or the like) based on image information. In the ink jet recording method, recording is performed by causing a recording head to discharge ink on a recording medium. The advantages thereof over other recording methods are a capability of recording highly accurate images at a high speed, a low running cost, quietness, and so on.

As a computer interface to be connected to a printer, a new serial bus USB (universal serial bus) has been utilized in addition to a conventional parallel interface (based on Centronics). The USB interface (vers. 1.0) has a transfer speed of 12 Mbps at full speed, and 1.5 Mbps at a low speed. The transfer methods thereof comprise four types, i.e., "isochronous", "interrupt", "control", and "bulk" types. For a printer, the "bulk" transfer type, which has an error correcting function during communication, is generally used.

Also, this type is fully adaptable to plug-and-play, and even though the device is connected when a personal computer has booted up, recognition is performed without the need for restart. A signal is transferred by the serial transfer method using an operation signal, and is constituted of signals D+ and D−.

Much effort has been spent on the reduction in power consumption. For example, when a printer is not operating, the microcomputer controlling the printer is placed in a low power consumption state. For this purpose, there is a method wherein the microcomputer is placed on standby in a low power consumption mode. For example, with a CPU placed in a halt mode, power consumption can be suppressed by halting access from the CPU to external memories (ROM or RAM).

There is also another method wherein, with the CPU placed in the stop mode, clock supply to peripheral circuits, including the CPU, is stopped. This method can reduce power consumption more than the halt mode. By these methods, an ink jet recording device and a controlling method therefor wherein, for example, a non-maskable interrupt (NMI) signal is assigned to the control key of a printer, and wherein the printer can be started by pushing the control key, can be provided.

However, when attempting to perform a restart, such methods of halting or stopping the CPU using the halt mode or the stop mode in printer logic circuitry including the CPU can respond only to an instruction from the control panel of the printer, or the like. Therefore, a user cannot restart the printer by issuing an instruction from a host computer.

SUMMARY OF THE INVENTION

Accordingly, the present invention can provide an ink jet recording device and a controlling method therefor that are capable of restarting a printer by issuing the instruction from a host computer.

The present invention provides a recording device that comprises an interface control section for communicating with a host computer; a CPU operable in a stop mode in which the CPU is on standby in a low power consumption state; and a clock control section controlling so that the supply of a clock signal is continuously performed with respect only to the interface control section upon receipt of an instruction to switch to the stop mode, the instruction being outputted from the CPU according to a predetermined condition.

Also, the present invention provides a method for controlling a recording device that comprises an interface control section for communicating with a host computer, and a CPU operable in a stop mode in which the CPU is on standby in a low power consumption state. This method includes the steps of instructing the CPU to switch to the stop mode according to a predetermined condition; and controlling a clock signal so that the supply of the clock signal is continuously performed with respect only to the interface control section upon receipt of the transfer instruction.

The present invention can also provide a recording device including interface control means, processing means and clock control means. The interface control means communicates with a host computer. The processing means is operable in a stop mode in which the processing means is on standby in a low power consumption state. The clock control means controls so that the supply of a clock signal is continuously performed with respect only to the interface control means upon receipt of an instruction to switch to the stop mode. The instruction is outputted from the processing means according to a predetermined condition.

Further objects, features and advantages of the present invention will become apparent from the following description of the preferred embodiments with reference to the attached drawings.

DESCRIPTION OF THE PREFERRED EMBODIMENTS

Figure 1:
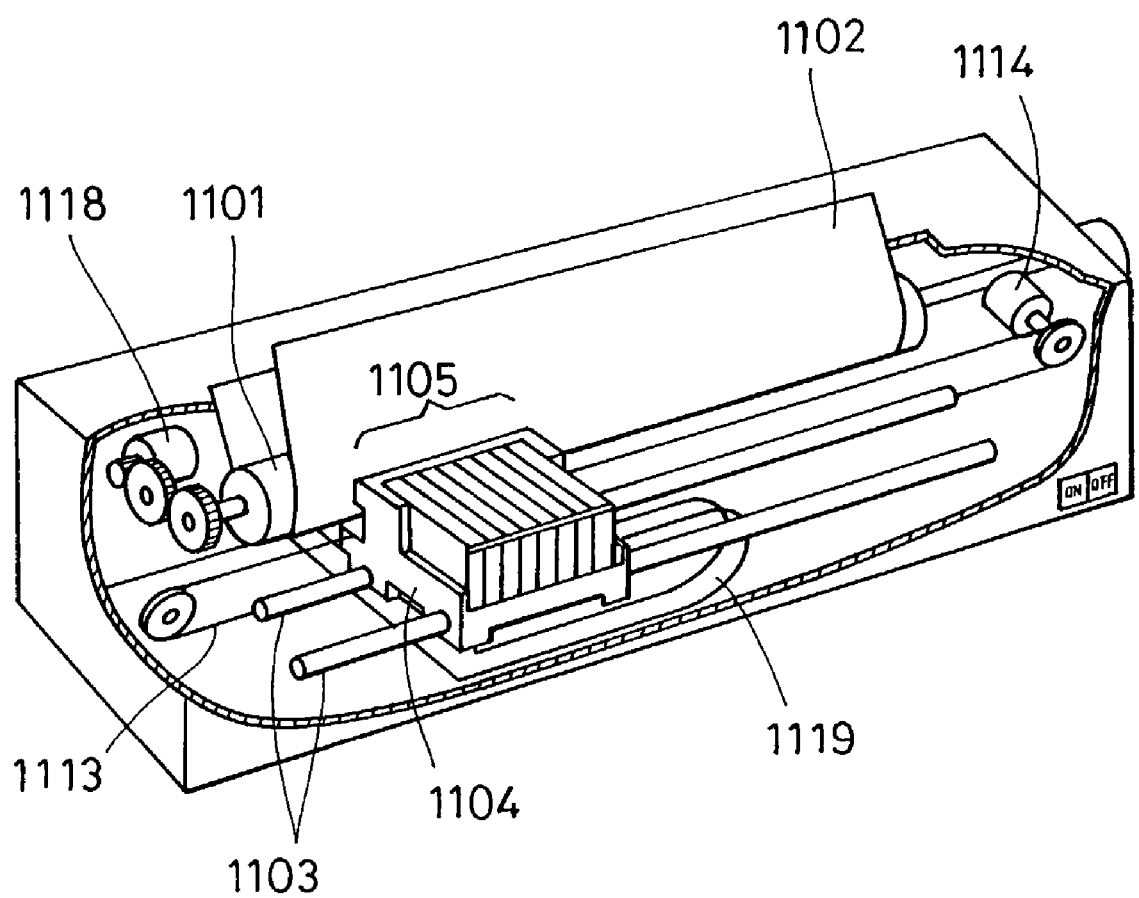
FIG. 1 is a perspective view showing a printer according to an embodiment of the present invention.

FIG. 1 is a perspective view showing an ink jet recording device (printer) according to an embodiment of the present invention.

Reference numeral 1105 denotes a recording head. The recording head 1105 is mounted on a carriage 1104 and is reciprocatable in the longitudinal direction along shafts 1103. Ink discharged from the recording head 1105 arrives on a recording member 1102, the recording surface of which is defined by a platen roller 1101 maintained a minute distance from the recording head 1105, and forms an image on the recording member 1102.

A discharge signal based on image data is supplied to the recording head 1105 via a flexible cable 1119. Reference numeral 1114 denotes a carriage motor for driving the carriage 1104 to scan along the shafts 1103. Reference 1113 denotes a wire for transmitting the driving force of the motor 1114 to the carriage 1104. Reference number 1118 denotes a conveying motor interconnected with the platen roller 1101 for conveying the recording member 1102. This ink jet recording device is connected to a host computer such as a personal computer through a USB interface, and receives image data sent from the personal computer.

The resolution of the recording head 1105 is 600 DPI, for example. The recording head 1105 is of an ink jet type, and includes 320 recording elements for a black ink and 128 recording elements for each of color inks arranged therein. Each of the recording elements comprises a drive portion and a nozzle, and the drive portion is capable of supplying heat to ink by a heater. The ink generates a film boiling due to the heat, and the ink is discharged from the nozzle by a pressure change caused by the growth or contraction of bubbles generated by the film boiling.

Figure 2:
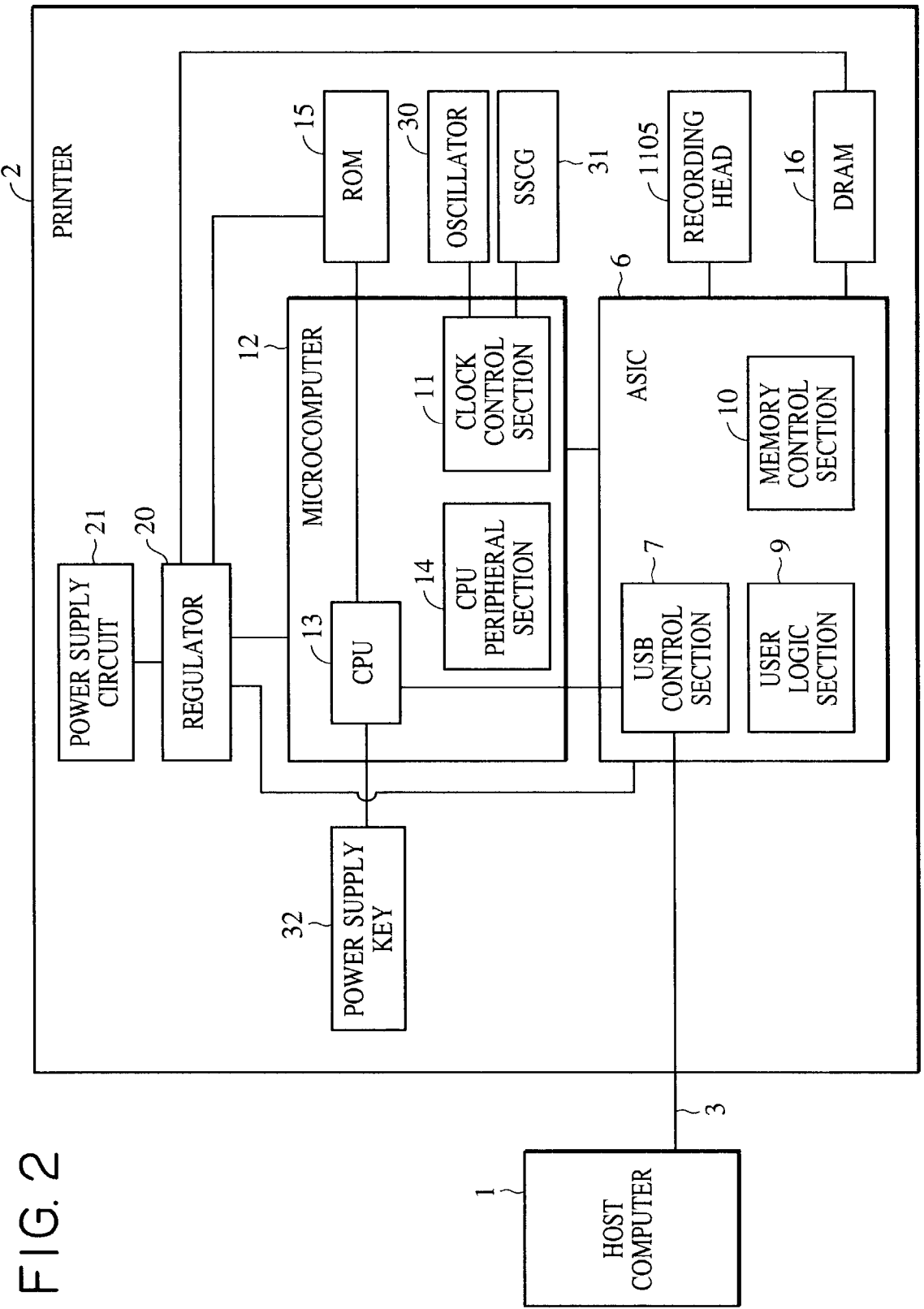
FIG. 2 is a functional block diagram showing the printer according to the embodiment.

FIG. 2 is a functional block diagram showing the printing system according to the present invention. Reference numeral 1 designates a host computer (personal computer), and 2 designates a printer. Reference numeral 3 designates a USB interface. The printer 2 receives image signals and instruction signals from the personal computer 1 by utilizing this USB interface.

The USB interface 3 has a serial signal line (D+ and D−) and a 5-volt power supply line. Hereinafter this 5-volt power supply line is referred to as Vbus. This Vbus allows the power supply from the host computer 1 to the printer 2. The serial signal line is connected to the USB control section 7 of an ASIC 6.

The logic circuitry of the printer 2 comprises a microcomputer 12, the ASIC 6, a ROM 15, a DRAM 16, an oscillator 30, and an SSCG 31.

The microcomputer 12 sets an instruction to the ASIC 6, and controls the ASIC 6. The microcomputer 12 comprises three circuit blocks: the CPU 13 executing a program, a CPU peripheral section 14 including an interrupt controller, a timer and the like, and a clock control section 11.

From the clock control section 11, a clock signal of 48 MHz is supplied to the USB control section 7, and a clock signal of 24 MHz is supplied to the circuits other than the USB control section 7. The clock control section 11 has an output control register that controls the ON/OFF of the output of a clock signal to each of the circuit blocks. By the value in this register, whether the output of the clock signal is appropriate or not is determined.

When a reset signal is inputted to the microcomputer 12, the CPU 13 is reset, and executes an initialization program. If the CPU 13 has transferred to the stop mode, the stop mode is canceled by this reset signal. The output control register is initialized by an initialization register value, and is permitted to output to all circuit blocks including the CPU 13 by this initialization. Thereby, the clock control section 11 supplies a clock signal to each of the circuit blocks.

The clock control section 11 includes an oscillation stabilization waiting circuit. When the CPU 13 transfers from the stop mode to a normal mode by the above-mentioned circuit, the clock control section 11 waits for approximately 2 msec until the clock signal from the SSCG 31 described later becomes stabilized, and thereafter supplies a clock signal to the CPU 13.

The ASIC 6 comprises three blocks: the USB control section 7, a user logic section 9, and a memory control section 10. The user logic section 9 is either a circuit for controlling the discharge of the recording head 1105, or a circuit for processing print data sent from the host device.

The oscillator 30 supplies a clock signal of 48 MHz to the clock control section 11. The clock control section 11 divides the frequency of the clock signal of 48 MHz, and supplies a clock signal of 24 MHz to the spread spectrum clock generator (SSCG) 31. The SSCG 31 modulates the inputted clock signal of 24 MHz, and supplies the clock signal, which is fluctuated in frequency by the modulation, to the clock control section 11. This reduces the intensity of emission of a particular frequency emitted from this logic circuitry, thereby providing countermeasures against EMI (electromagnetic interference).

The ROM 15 stores the programs that the CPU is to execute, and the DRAM 16 with a memory space as a temporary working area is used for the ASIC 6.

A regulator 20 receives a power supply from a power supply circuit 21, and produces voltages of 2.5 volts to be supplied to the microcomputer 12 and the ASIC 6, and in addition, produces the voltage of 3.3 volts. Hereinafter, the voltages of 2.5 volts and 3.3 volts are referred to as 2.5 V and 3.3 V, respectively. The microcomputer 12 and ASIC 6 are operated with 2.5 V, while the input/output sections thereof (input ports and output ports for gaining access to the outside), the ROM 15, and the DRAM 16 are operated with 3.3 V. The carriage motor 1114 and the conveying motor 1118 are driven by 27 V.

The printer 2 switches to a standby state when it does not perform a recording operation for a predetermined time period (5 minutes) using timer means (not shown) provided therein. However, even if the predetermined time period (5 minutes) has not elapsed, e.g., when the USB cable connected to the host computer 1 is withdrawn, or when the power supply for the host computer is switched off, the printer 2 also switches to the standby state. Any of these cases corresponds to a case where the voltage Vbus of the USB interface 3 has changed from 5 V to 0 V.

At this time, the logic circuitry including the microcomputer 12 and ASIC 6 are performing control so as to reduce power consumption as follows.

The CPU 13 transfers from the normal mode to the stop mode. At this time, the microcomputer 12 and the ASIC 6 are applied with a voltage of 2.5 V, but, since the CPU 13 is in the stopped state, power consumption can be reduced. The CPU 13 performs setting of the output control register of the clock control section 11, thereby the clock control section 11 continues clock supply with respect only to the USB control section 7, and stops the supply of the clock signal to each of other circuit blocks. This operation of the clock control section 11 suppresses the current consumption of the microcomputer 12 and ASIC 6 to a minimum. Since the USB control section 7 is operating with the supply of the clock signal, the USB control section 7 is in a state to allow acceptance of a signal from the host computer.

For example, when the USB cable connected to the host computer 1 is withdrawn, or when the power supply for the host computer is switched off, it is the USB control section 7 that detects a change in the voltage Vbus and outputs a signal to a predetermined port of the CPU 13. With this signal inputted, the CPU 13 transfers to the stop mode. This signal that is outputted to the CPU 13 is, for example, an interrupt signal.

The ROM 15 is applied with a voltage of 3.3 V, but, since the CPU 13 stops and gains no access to the ROM 15, current consumption becomes as low as about 1 mA (the current consumption when the CPU accesses the ROM is several tens of milliamperes). This stop mode of the CPU 13 is to be transferred by a predetermined instruction.

In the printer 2 according to the embodiment of the present invention, the current consumption in the logic circuitry when the printer 2 is on standby, is approximately 40 mA for the 2.5 V system (the USB control section and the clock control section predominantly consume current), and is approximately 1 mA for the 3.3 V system. In the ready state of the printer 2 (this state is, for example, one in which the printer can perform printing upon receipt of a signal from the host computer, and at this time, the CPU, ASIC, ROM, and RAM are in access states), the current consumption in the logic circuitry is approximately 60 mA for the 2.5 V system, and is approximately 30 mA for the 3.3 V system. The printer 2 according to the present embodiment, therefore, allows power saving to be realized.

The CPU 13 can also prohibit the output of a clock signal to the USB control section 7 by setting a value to prohibit the output of the clock signal in the output control register of the clock control section 11. With this setting performed, the current consumption of the 2.5 V system becomes 1 mA, thereby further reducing the power consumption of the logic circuitry. Meanwhile, without receiving supply of a clock signal, the USB control section 7 can detect the level of the voltage Vbus of the USB interface 3, and therefore, as described later, the USB control section 7 can detect the change of the voltage Vbus from 0 V to 5 V.

Next, the case where the printer 2 restarts from the standby state will be described. When the USB control section 7 receives a resume signal from the personal computer via the USB interface 3, the USB control section 7 outputs a signal to the predetermined port of the CPU 13. With this signal inputted, the CPU 13 switches from the stop mode to the normal mode, and also starts to gain access to the ROM 15. The address to be accessed is predetermined, and the CPU 13 executes the program stored in the ROM 15, using the address.

The CPU 13 has a plurality of input ports, and one of them is connected to a power supply key 32 on the control panel of the printer 2. When the user depresses the power supply key, the CPU 13 switches from the stop mode to the normal mode, and executes the above-described processing.

Also, when the voltage Vbus of the USB interface 3 changes from 0 V to 5 V, the printer 2 switches from the standby state to the ready state. This switching is performed, for example, by interconnecting the personal computer in a power-on state and the printer 2 by the USB cable, or by switching on the personal computer with the printer 2 connected thereto.

When the voltage Vbus changes from 0 V to 5 V, the USB detects it, and outputs a signal to the predetermined port of the CPU 13. With this signal inputted, the CPU 13 switches from the stop mode to the normal mode.

Thereafter, the CPU 13 outputs a signal to the clock control section 11. At this time, the CPU performs setting such that the value of the output control register that controls the on-off of the output of a clock signal is turned on with respect to each of the circuit blocks. Based on the register value, the clock control section 11 starts to supply a clock signal to each of the CPU peripheral section 14, the user logic circuit 9, and the memory control section 10. Then, the DRAM 16 enters an operating state under an instruction from the memory control section 10 and starts to refresh. Thereby, all logic circuits of the printer 2 enter operation states, and the printer 2 can restart and switch to the ready state. With a print instruction from the host computer 1 received, the printer 2 starts a recording operation.

Besides the above-described operations, the CPU 13 reads out data from the ROM and performs initialization processing such as the setting of an initial value for the DRAM 16.

With these arrangements, the peripheral section 14 of the microcomputer 12, the user logic circuit 9 of the ASIC 6, and the memory control section 10 stop operations thereof, and only the USB control section 7 operates. This allows current consumption when the printer 2 is on standby to be reduced, and enables the overall power consumption of the entire logic circuitry, including the microcomputer 12 and the ASIC 6, to be suppressed.

Without an input signal from the host computer 1, the printer 2 stays on standby in a low power consumption state, and can maintain the low power consumption. With an input signal from the host computer 1 inputted, the printer 2 can be restarted at any time.

Figure 3:
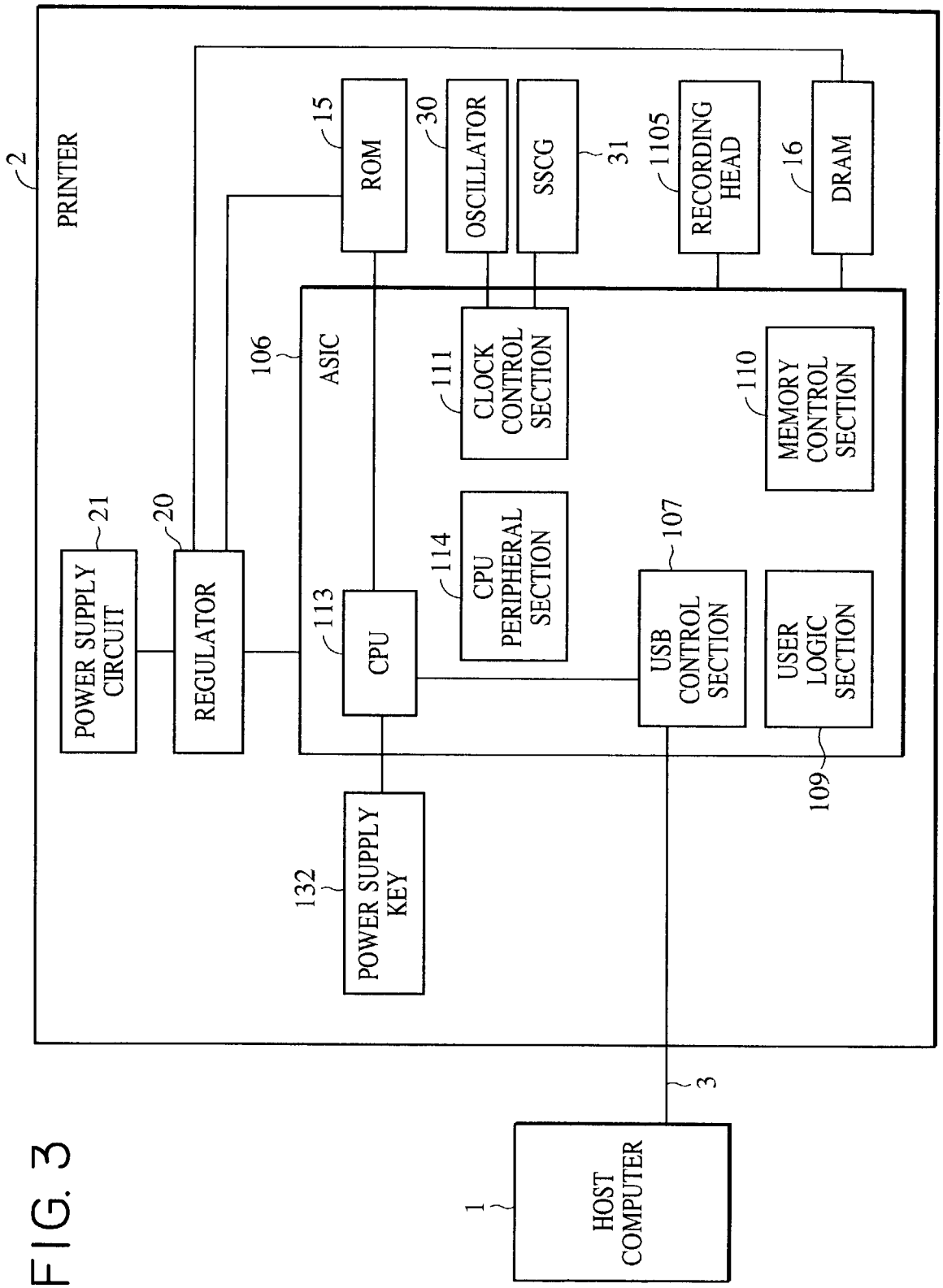
FIG. 3 is a functional block diagram showing the printer according to another embodiment.

In another embodiment of the present invention, the microcomputer 12 and the ASIC 6 may be made a one-chip ASIC 106, as shown in FIG. 3. Also, the drive voltage for the microcomputer 12 and the ASIC 6 is not limited to voltage values such as 3.3 V and 2.5 V, but other voltage values such as 1.8 V may be adopted.

The switching of the CPU 13 to the stop mode may be executed by inputting a signal to a predetermined terminal of the CPU 13, in addition to the switching executed by the instruction of software.

As a condition for the switching of the CPU 13 from the normal mode to the stop mode, the case where a recording operation is not performed for 5 minutes has been described. However, this time period when a recording operation is not performed is not limited to 5 minutes. Meanwhile, there is a method for switching the CPU 13 to the stop mode by a user pressing a transfer button of the printer driver of the host computer. In the setting of the printer driver, an arbitrary elapse time is selected from among 5, 10, 15, 30, and 60 minutes, an instruction is issued from the host computer to the printer, and the CPU 13 switches to the stop mode when the designated time has elapsed.

The interface with the host computer 1 is not limited to the USB interface. For example, in the case of an IEEE1284 specification, an interface can be realized by providing an interface control section of the IEEE1284.

When a reset signal is inputted to the microcomputer 12, the initialization value of the output control register is not restricted. Any value that at least permits an output to the CPU may be used.

In the present embodiment, the memory space as a working area is set to be the DRAM 16, but an SDRAM may instead be used as the memory space.

As a configuration of the printer, a serial type, which performs recording with a carriage being reciprocated, has been described as an example, but the configuration of the printer is not limited to such a serial type. Alternatively, a printer using a full-line type recording head, having a length corresponding to the maximum width of a recording medium on which the printer can record, may be employed.

As a recording head, a type wherein a heater is energized and ink is discharged has been described as an example, but a recording head using a piezoelectric element may instead be used.

As is evident from the foregoing, according to the present invention, when the printer is on standby, the CPU switches to the stop mode, and the clock control section continues clock supply only to the interface control section and stops the output of a clock signal to each of the circuit blocks other than the interface control section, thereby reducing the power consumption in the logic circuitry in the printer. The printer can restart by the instruction from the host computer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of following claims is to be accorded the broadest interpretation so as to encompass all such modifications and equivalent structures and functions.

What is claimed is:

1. A recording device, comprising:
   an interface control section for communicating with a host computer;
   a CPU operable in a stop mode in which said CPU is on standby in a low power consumption state and in a normal mode in which said CPU is on standby in a normal consumption state;
   an oscillator for outputting first clock signals;
   a clock generator for generating second clock signals by inputting the first clock signals and modulating the first clock signals to a predetermined frequency, and outputting the second clock signals; and
   a clock control section for inputting the first and second clock signals and outputting the first clock signals to the interface control section and the second clock signals to said CPU, respectively, regardless of operation mode of said CPU,
   wherein said clock control section stops output of the second clock signals to said CPU when the operation mode of said CPU switches from the normal mode to the stop mode, and performs output of the second clock signals after waiting for a predetermined time period while the operation mode of said CPU switches from the stop mode to the normal mode when a signal is inputted to said interface control section from the host computer.

2. A recording device according to claim 1, further comprising a plurality of circuit blocks including said interface control section for controlling interface which communicates with said host computer, wherein one of the first or second clock signals is supplied to the plurality of circuit blocks in accordance with an instruction from said CPU when said CPU switches from the stop mode to the normal mode.

3. A recording device according to claim 1, further comprising a waiting circuit that waits for the second clock signals inputted from said clock generator to be outputted to said CPU for a predetermined time period, when the operation mode of said CPU switches from the stop mode.

4. A recording device according to claim 2, further comprising a waiting circuit that waits for the second clock signals inputted from said clock generator to be outputted to said CPU for a predetermined time period, when the operation mode of said CPU switches from the stop mode.

5. A recording device according to claim 1, wherein:
   said clock control section comprises an output control register that controls the output of the first and second clock signals, and
   when a reset signal is inputted to said CPU and the stop mode is reset, said clock control section initializes said output control register, and at least sets a value that permits the output of the second clock signals to said CPU.

6. A recording device according to claim 1, wherein an interface that performs power supply from the host computer to said interface control section is connectable.

7. A recording device according to claim 1, wherein said interface control section controls a USB interface.

8. A recording device according to claim 1, further comprising an ink jet recording head for performing a recording operation.

9. A recording device according to claim 8, wherein said ink jet recording head comprises a plurality of recording elements, each of which includes an electrothermal transducer generating thermal energy for discharging ink.

10. A method for controlling a recording device that comprises an interface control section for communicating with a host computer, a CPU operable in a stop mode in which the CPU is on standby in a low power consumption state and in a normal mode in which the CPU is on standby in a normal consumption state, an oscillator for outputting first clock signals and a clock generator for generating second clock signals by inputting first clock signals and modulating the first clock signals to a predetermined frequency and outputting the second clock signals, the method comprising the steps of:
    inputting the first and second clock signals and outputting the first clock signals to the interface control section regardless of operation mode of the CPU;
    outputting the second clock signals to the CPU;
    stopping output of the second clock signals to the CPU when the operation mode of the CPU switches from the normal mode to the stop mode; and
    outputting the second clock signals after waiting for a predetermined time period while the operation mode of the CPU switches from the stop mode to the normal mode when a signal is inputted to the interface control section from the host computer.

11. A method according to claim 10, for controlling a recording device that comprises a plurality of circuit control blocks including the interface control section controlling interface which communicates with the host computer, wherein the method further comprises a step of supplying one of the first or second clock signals to the plurality of circuit blocks in accordance with the instruction from the CPU when the operation mode of the CPU switches from the stop mode to the normal mode.

12. A method according to claim 11, further comprising the step of, when a reset signal is inputted to the CPU and the stop mode is reset, initializing an output control register for controlling the output of the clock signal, and at least setting a value that permits the output of the clock signal to the CPU.

13. A method according to claim 10, wherein an interface that performs power supply from the host computer to the interface control section is connectable.

14. A method according to claim 10, wherein the interface control section controls a USB interface.

15. A recording device, comprising:
    interface control means for communicating with a host computer;
    processing means operable in a stop mode in which said processing means is on standby in a low power consumption state and in a normal mode in which said processing means is on standby in a normal consumption state;
    oscillating means for outputting first clock signals;
    clock generating means for generating second clock signals by inputting the first clock signals and modulating the first clock signals to a predetermined frequency, and outputting the second clock signals; and clock control means for inputting the first and second clock signals and outputting the first clock signals to the interface control means and the second clock signals to said processing means, respectively, regardless of operation mode of said processing means, wherein said clock control means stops output of the second clock signals to said processing means when the operation mode of said processing means switches from the normal mode to the stop mode, and performs output of the second clock signals after waiting for a predetermined time period while the operation mode of said processing means switches from the stop mode to the normal mode when a signal is inputted to said interface control means from the host computer.

16. A recording device according to claim 15, further comprising a plurality of circuit blocks including said interface control means for controlling interface which communicates with the host computer, wherein one of the first or second clock signals is supplied to the plurality of circuit blocks in accordance with an instruction from said processing means when said processing means switches from the stop mode to the normal mode.

17. A recording device according to claim 15, further comprising waiting means that waits for the second clock signals inputted from said clock generating means to be outputted to said processing means for a predetermined time period, when the operation mode of said processing means switches from the stop mode.

18. A recording device according to claim 16, further comprising waiting means that waits for the second clock signals inputted from said clock generating means to be outputted to said processing means for a predetermined time period, when the operation mode of said processing means switches from the stop mode.

19. A recording device according to claim 15, wherein:
said clock control means comprises output control register means that controls the output of the first and second clock signals, and
when a reset signal is inputted to said processing means and the stop mode is reset, said clock control means initializes said output control register means, and at least sets a value that permits the output of the second clock signals to said processing means.

20. A recording device according to claim 15, wherein interface means that performs power supply from the host computer to said interface control means is connectable.

21. A recording device according to claim 15, wherein said interface control means controls a USB interface.

22. A recording device according to claim 15, further comprising ink jet recording means for performing a recording operation.

23. A recording device according to claim 22, wherein said ink jet recording means comprises a plurality of recording elements, each of which includes an electrothermal transducer generating thermal energy for discharging ink.

* * * * *